(12) United States Patent
Newman

(10) Patent No.: US 11,818,465 B2
(45) Date of Patent: Nov. 14, 2023

(54) SYSTEMS, APPARATUS, AND METHODS FOR STABILIZATION AND BLENDING OF EXPOSURES

(71) Applicant: GoPro, Inc., San Mateo, CA (US)

(72) Inventor: David Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 19 days.

(21) Appl. No.: 17/647,581

(22) Filed: Jan. 10, 2022

(65) Prior Publication Data

US 2023/0224583 A1 Jul. 13, 2023

(51) Int. Cl.
*H04N 23/68* (2023.01)
*H04N 23/73* (2023.01)
*H04N 23/63* (2023.01)

(52) U.S. Cl.
CPC ......... *H04N 23/683* (2023.01); *H04N 23/631* (2023.01); *H04N 23/689* (2023.01); *H04N 23/6812* (2023.01); *H04N 23/73* (2023.01)

(58) Field of Classification Search
None
See application file for complete search history.

(56) References Cited

U.S. PATENT DOCUMENTS

| | | | | |
|---|---|---|---|---|
| 11,039,079 B1* | 6/2021 | Sandofsky | ............ | G06T 3/0075 |
| 2010/0271512 A1* | 10/2010 | Garten | ............... | H04N 5/232 |
| | | | | 382/284 |
| 2013/0135486 A1* | 5/2013 | Wan | ............... | H04N 5/765 |
| | | | | 348/207.99 |
| 2013/0208138 A1* | 8/2013 | Li | ............... | H04N 23/72 |
| | | | | 348/229.1 |
| 2014/0300805 A1* | 10/2014 | Davis | ............... | H04N 23/55 |
| | | | | 348/362 |
| 2015/0312557 A1* | 10/2015 | Kim | ............... | H04N 23/10 |
| | | | | 348/46 |
| 2017/0302840 A1* | 10/2017 | Hasinoff | ............... | H04N 25/589 |
| 2018/0302543 A1* | 10/2018 | Somasundaram | ..... | H04N 23/72 |
| 2020/0007738 A1* | 1/2020 | Chu | ............... | H04N 9/646 |
| 2020/0106945 A1* | 4/2020 | Hsieh | ............... | G06T 11/60 |

(Continued)

OTHER PUBLICATIONS

3GPP TS 23.501 (System Architecture for the 5G System (5GS), version 17.5.0, published Jun. 15, 2022.

(Continued)

*Primary Examiner* — Cynthia Segura
(74) *Attorney, Agent, or Firm* — Wang Hardoon, P.C.

(57) ABSTRACT

Systems, apparatus, and methods for stabilization and blending of exposures. So-called Electronic Image Stabilization (EIS) techniques use image manipulation software to compensate for camera motion. Unfortunately, existing EIS techniques cannot compensate for artifacts introduced by low shutter speed (e.g., blurs). Various embodiments of the present disclosure generate stabilized images from multiple exposures. In one exemplary embodiment, the stabilized exposures are blended using a linear sum of the color data for each pixel of the image. By stabilizing each exposure and linearly summing the light information, the camera shake can be removed, and the subject motion blur can be controlled. The stabilization and blending techniques enable a mathematical emulation of a selected shutter angle from many high-speed exposures.

20 Claims, 10 Drawing Sheets

(56) References Cited

U.S. PATENT DOCUMENTS

2021/0337101 A1* 10/2021 Yuan .................. H04N 23/6812
2022/0007040 A1* 1/2022 Ward .................... H04N 5/265

OTHER PUBLICATIONS

3GPP TS 24.501(Non-Access-Stratum (NAS) Protocol for 5G System (5G); Stage 3, version 17.5.0, published Jan. 5, 2022.
Huang et al., Real-Time Intermediate Flow Estimation for Video Frame Interpolation, arXiv:2011.06294v12, submitted Jul. 13, 2022.
Alvarez, Luis, et al. "Symmetrical dense optical flow estimation with occlusions detection." International Journal of Computer Vision 75 (2007): 371-385.
Che, Tongtong, et al. "SDOF-GAN: Symmetric dense optical flow estimation with generative adversarial networks." IEEE Transactions on Image Processing 30 (2021): 6036-6049.
GitHub—98mxr_GMFSS_Fortuna_ All in one place, Jun. 25, 2023, 3 pages.
GitHub—haofeixu_gmflow_ [CVPR 2022 Oral] GMFlow_ Learning Optical Flow via Global Matching Nov. 14, 2022, 8 pages.
GitHub—hyw-dev_GMFSS_ GMFlow based video frame interpolation, Apr. 3, 2023, 3 pages.
GitHub—megvii-research_ECCV2022-RIFE_ ECCV2022—Real-Time Intermediate Flow Estimation for Video Frame Interpolation, Jul. 4, 2022, 8 pages.
Huang, Zhewei, et al. "Real-time intermediate flow estimation for video frame interpolation." European Conference on Computer Vision. Cham: Springer Nature Switzerland, 2022.
Stone, Austin, et al. "Smurf: Self-teaching multi-frame unsupervised raft with full-image warping." Proceedings of the IEEE/CVF conference on Computer Vision and Pattern Recognition. 2021.
Wang, Yang, et al. "Occlusion aware unsupervised learning of optical flow." Proceedings of the IEEE conference on computer vision and pattern recognition. 2018.
Wang, Yang, et al. "Occlusion aware unsupervised learning of optical flow." Proceedings of the IEEE conference on computer vision and pattern recognition. 2018. SLIDES.
Xu, Haofei, et al. "Gmflow: Learning optical flow via global matching." Proceedings of the IEEE/CVF conference on computer vision and pattern recognition. 2022.
SVFI User Guide—Chinese (original) Aug. 18, 2022, 43 pages.
SVFI User Guide—Machine Translation, May 25, 2023, 50 pages.

* cited by examiner

| ACTUAL MOTION | GHOST ARTIFACTS IN 1/48 EXPOSURE | APPARENT MOTION GHOSTS IN STABILIZED FOOTAGE |
|---|---|---|
|  $E_0$ |  |  $I_0$ |
|  $E_1$ |  |  $I_1$ |
|  $E_2$ |  |  $I_2$ |
|  $E_3$ |  |  $I_3$ |

SYSTEMS, APPARATUS, AND METHODS FOR STABILIZATION AND BLENDING OF EXPOSURES

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the field of digital image capture. More particularly, the present disclosure relates to systems, computer programs, devices, and methods for electronic image stabilization of digital images.

DESCRIPTION OF RELATED TECHNOLOGY

Photography captures light information to media. Historically analog photography used light sensitive chemicals that reacted when exposed to light. Modern photography uses photoelectric sensors to capture luminance and chrominance information. Digital cameras provide images that can be rendered on a variety of different devices, such as televisions, laptops, etc. Digital photography inherits the analog photography concepts of shutter speed, ISO (sensor gain), and aperture.

Image stabilization refers to techniques that reduce blurring and/or jitter. Jitter may be introduced by camera motion during image capture (e.g., due to handshake or vehicle motion, etc.) When successful, image stabilization can produce sharper images and/or smoother, less jittery motion in video. Most techniques for image stabilization rely on mechanical movements, e.g., an external gimble or internal adjustment of the lens or sensor within the camera itself. In contrast, so-called Electronic Image Stabilization (EIS) techniques use image manipulation software to compensate for camera motion. Unfortunately, existing EIS techniques impose certain limitations for camera settings, e.g., certain cinematographic effects rely on blurring, which impairs EIS operation.

DETAILED DESCRIPTION

Figure 1:
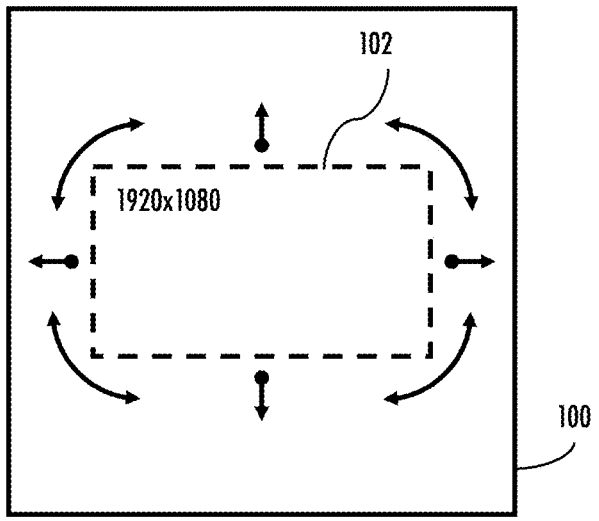
FIG. 1 is a graphical representation of Electronic Image Stabilization (EIS) techniques, useful in explaining various aspects of the present disclosure.
Figure 1:
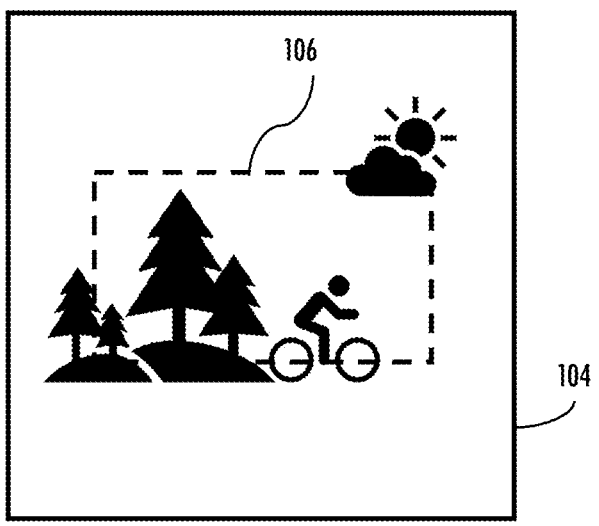
Figure 1:

In the following detailed description, reference is made to the accompanying drawings which form a part hereof, wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Electronic Image Stabilization (EIS): In-Camera Versus Post-Processing

Electronic Image Stabilization (EIS) techniques are generally implemented in-camera (via embedded hardware), or alternatively in post-processing (via video editing software). Over time, in-camera and post-processing EIS solutions have diverged in operation and capability. These differences reflect the most commonly available device resources and usage scenarios. For example, in-camera EIS relies on device sensors and runs on real-time budgets. In-camera EIS is convenient for casual viewing and can be immediately shareable (e.g., via social networks, peer-to-peer connectivity, etc.) In contrast, post-processing EIS techniques are computationally complex and usually used by power users that desire (or require) higher quality stabilization. In many cases, post-processing EIS techniques only process image data (since orientation data is not part of standard audio/visual (A/V) data formats).

Consider a camera or other imaging device that captures a series of images having a field of view. As used herein, the "captured view" refers to the total image data that is available for Electronic Image Stabilization (EIS) manipulation. EIS algorithms generate a "designated view" to create the illusion of stability; the designated view corresponds to a portion of the captured view. A designated view of an image is the visual portion of the image that may be presented on a display and/or used to generate frames of video content. In some cases, the designated view may also be referred to as a "cut-out" of the image, a "cropped portion" of the image, or a "punch-out" of the image.

Notably, the difference between the designated view and the captured field of view defines a "stabilization margin." The designated view may freely pull image data from the stabilization margin. For example, a designated view may be rotated with respect to the originally captured view (within the bounds of the stabilization margin). In certain embodiments, the captured view (and likewise the stabilization margin) may change between frames of a video. Digitally zooming (proportionate shrinking or stretching of image content), warping (disproportionate shrinking or stretching of image content), and/or other image content manipulations may also be used to maintain a desired perspective or subject of interest, etc.

As a practical matter, EIS techniques must trade-off between stabilization and wasted data, e.g., the amount of movement that can be stabilized is a function of the amount of cropping that can be performed. Un-stable footage may result in a smaller designated view whereas stable footage may allow for a larger designated view. For example, EIS may determine a size of the designated view (or a maximum viewable size) based on motion estimates and/or predicted trajectories over a capture duration, and then selectively crop the corresponding designated views.

In-camera Electronic Image Stabilization (EIS) (or more broadly, "sensor-based EIS") uses sensor data (e.g., accelerometer and gyroscope) to determine the movement of the capture device. Then, each frame of video is rotated (tilted) to counteract the sensed motion. In-camera EIS greatly reduces apparent motion caused by camera shake and frame-to-frame jitter. As used herein, the term "apparent motion" refers to the illusion of an object's motion caused by the relative motion between the capture device and the object.

For example, as shown in FIG. 1, a large image capture 100 (e.g., 2880 pixels×2880 pixels) may be used to generate a stabilized high-definition (HD) output video frame 102 (e.g., 1920 pixels×1080 pixels). The EIS algorithm may select any contiguous 1920×1080 pixels and may rotate the output video frame 102 within the total captured field of view of the large image capture 100. For example, a camera may capture all of scene 104 but only use the narrower field of view of scene 106. After in-camera stabilization, the output video frame 108 can be grouped with other frames and encoded into video for transport off-camera. Since video codecs compress similar frames of video using motion estimation between frames, stabilized video results in much better compression (e.g., smaller file sizes, less quantization error, etc.)

Unlike in-camera Electronic Image Stabilization (EIS), post-processing EIS stabilizes video that has already been captured. In order to accommodate a variety of different video sources, existing EIS solutions may rely on both sensor data and/or optical flow-based correction that determines the apparent motion of objects by tracking feature points between consecutive frames. In other words, EIS correction in post-processing (after capture) is not a real-time process and can benefit from both image information as well as sensor data.

As a brief aside, image processing (such as feature point detection) is computationally complex and often requires calculating motion vectors for every point of the image/feature. In many cases, feature detection may use subsets of the image domain, often in the form of isolated points, continuous curves or connected regions. Certain types of image content may "confuse" feature detection algorithms, and by extension post-processing EIS; examples of such content may include e.g., tessellated and/or repetitive patterns (e.g., so-called "picket fence" artifacts), low edge content (e.g., clouds), and/or saturated and low-light conditions.

Additionally, images captured with sensors that use an electronic rolling shutter (ERS) expose rows of pixels to light at slightly different times during the image capture. Specifically, CMOS image sensors use two pointers to clear and read from each pixel value. An erase pointer discharges the photosensitive cell (or rows/columns/arrays of cells) of the sensor to erase it; a readout pointer then follows the erase pointer to read the contents of the photosensitive cell/pixel. The capture time is the time delay in between the erase and readout pointers. Each photosensitive cell/pixel accumulates the light for the same exposure time but they are not erased/read at the same time since the pointers scan through the rows. This slight temporal shift between the start of each row may result in a deformed image if the image capture device (or subject) moves.

Both EIS and ERS compensation techniques may be performed to correct for rolling shutter effects from camera motion. In one specific implementation, the capture device determines the changes in orientation of the sensor at the pixel acquisition time to correct the input image deformities associated with the motion of the image capture device. Specifically, the changes in orientation between different captured pixels can be compensated by warping, shifting, shrinking, stretching, etc. the captured pixels to compensate for the motion.

Exemplary Minimum Shutter Speed Control

Figure 2:
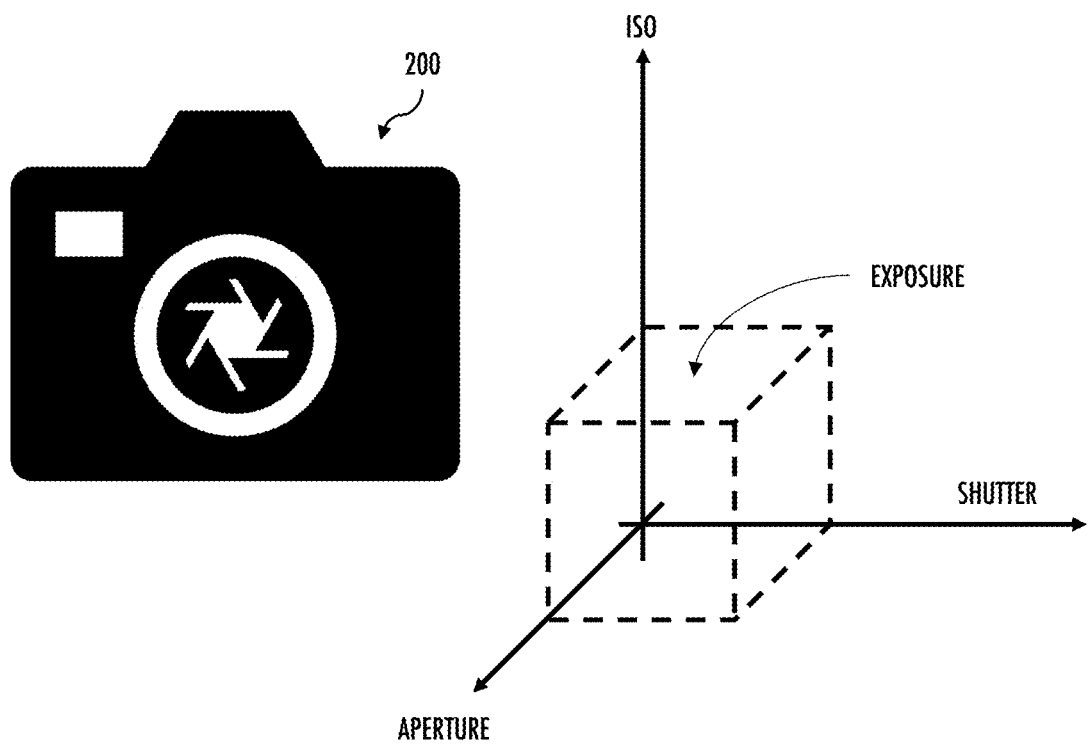
FIG. 2 is a graphical representation of exposure settings for a digital camera and an action camera, useful in explaining various aspects of the present disclosure.
Figure 2:
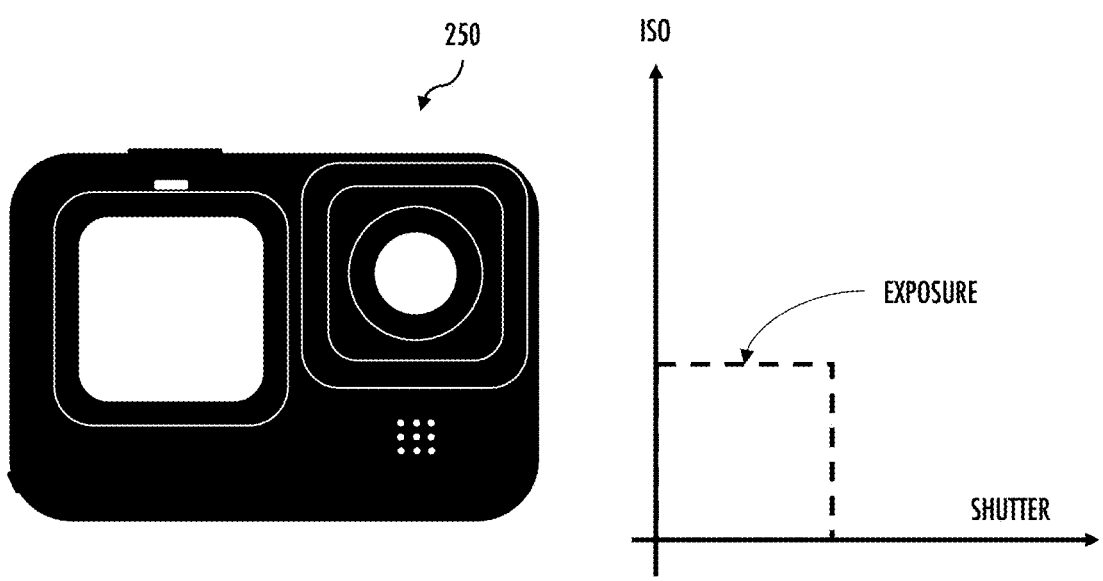

FIG. 2 is a graphical representation of a digital camera 200, useful in explaining various aspects of the present disclosure. In digital photography, "exposure" is based on three parameters: aperture, ISO (sensor gain) and shutter speed (exposure time). Exposure determines how light or dark an image will appear when it's been captured by the camera. During normal operation, a digital camera may automatically adjust aperture, ISO, and shutter speed to control the amount of light that is received. So-called "point-and-shoot" digital cameras have a field-of-view of approximately 60°; digital single-lens reflex (DSLR) cameras can be used with lens attachments that change the field-of-view (typically in the range of 30° to 90°). Traditional digital photography allows a user to set fixed values and/or ranges to achieve desirable aesthetic effects (e.g., shot placement, blur, depth of field, noise, etc.)

As a brief aside, the terms "shutter speed" refers to the amount of time that light is captured. Historically, a mechanical "shutter" was used to expose film to light; the term shutter is still used, even in digital cameras that lack of such mechanisms. For example, some digital cameras use an electronic rolling shutter (ERS) that exposes rows of pixels to light at slightly different times during the image capture. Specifically, CMOS image sensors use two pointers to clear and write to each pixel value. An erase pointer discharges the photosensitive cell (or rows/columns/arrays of cells) of the sensor to erase it; a readout pointer then follows the erase pointer to read the contents of the photosensitive cell/pixel. The capture time is the time delay in between the erase and readout pointers. Each photosensitive cell/pixel accumulates the light for the same exposure time but they are not erased/read at the same time since the pointers scan through the rows. A faster shutter speed has a shorter capture time, a slower shutter speed has a longer capture time.

A related term, "shutter angle" describes the shutter speed relative to the frame rate of a video. A shutter angle of 360° means all of the motion from one video frame to the next is captured, e.g. video with 24 frames per second (fps) using a 360° shutter angle will expose the photosensitive sensor for $\frac{1}{24}$th of a second. Similarly, 120 fps using a 360° shutter angle exposes the photosensitive sensor $\frac{1}{120}$th of a second. In low light, the camera will typically expose longer, increasing the shutter angle, resulting in more motion blur. Larger shutter angles result in softer and more fluid motion, since the end of blur in one frame extends closer to the start of blur in the next frame. Smaller shutter angles appear stuttered and disjointed since the blur gap increases between the discrete frames of the video. In some cases, smaller shutter angles may be desirable for capturing crisp details in each frame.

Most consumers are familiar with (and attempt to emulate) certain shooting styles. For example, the most common setting for cinema has been a shutter angle near 180°, which equates to a shutter speed near $\frac{1}{48}^{th}$ of a second at 24 fps. Cinematographers may have access to large mechanical gimbals, dollies, truck rigs, etc. and physically more massive cameras that results in less shaky footage and inertial swings; cinema cameras may also use larger sensors (with a multitude of ISO settings) that enable a wide range of shutter speeds and/or apertures. The combination of camera physics and exposure settings may provide cinematographers with more flexibility in shooting than was historically available in consumer grade photography. More recently however, the consumer electronics have improved, and consumer knowledge/tastes have evolved for a variety of other shooting styles. For example, some consumers may use shutter angles that mimic old 1950's newsreels (shorter than 180°).

FIG. 2 also depicts a fixed aperture camera 250 (i.e., the camera does not have an adjustable iris). Fixed aperture cameras are often used for action photography due to the form factor limitations and/or most common use cases (varied lighting conditions). For fixed aperture cameras, exposure can only be controlled by ISO and shutter speed. In order to mimic cinematic shooting styles, consumers may use external neutral density (ND) filters and/or other camera attachments that reduce the light intensity and change the auto exposure behavior. For example, to reduce light intensity by 5 stops (from $\frac{1}{1500}^{th}$ to $\frac{1}{48}^{th}$), an action camera may need a very dark ND filter. Additionally, ND filter solutions may also affect EIS (described in greater detail below).

Figure 3:
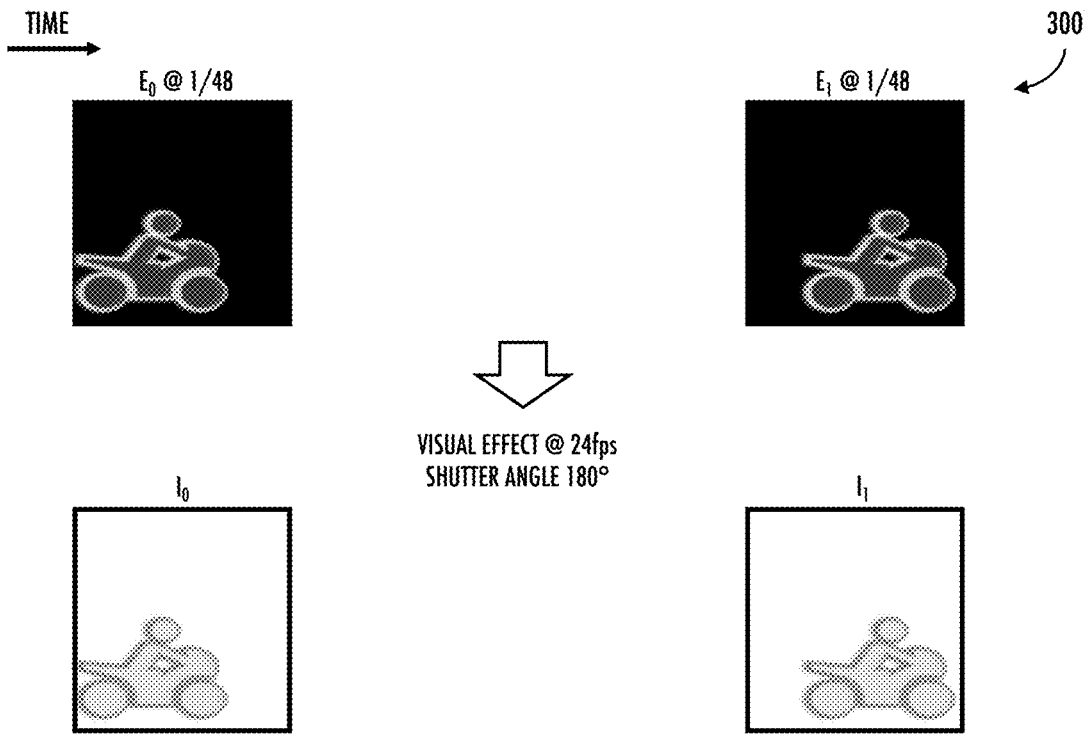
FIG. 3 is a graphical representation of different visual effects corresponding to different shutter angles, useful in explaining various aspects of the present disclosure.
Figure 3:
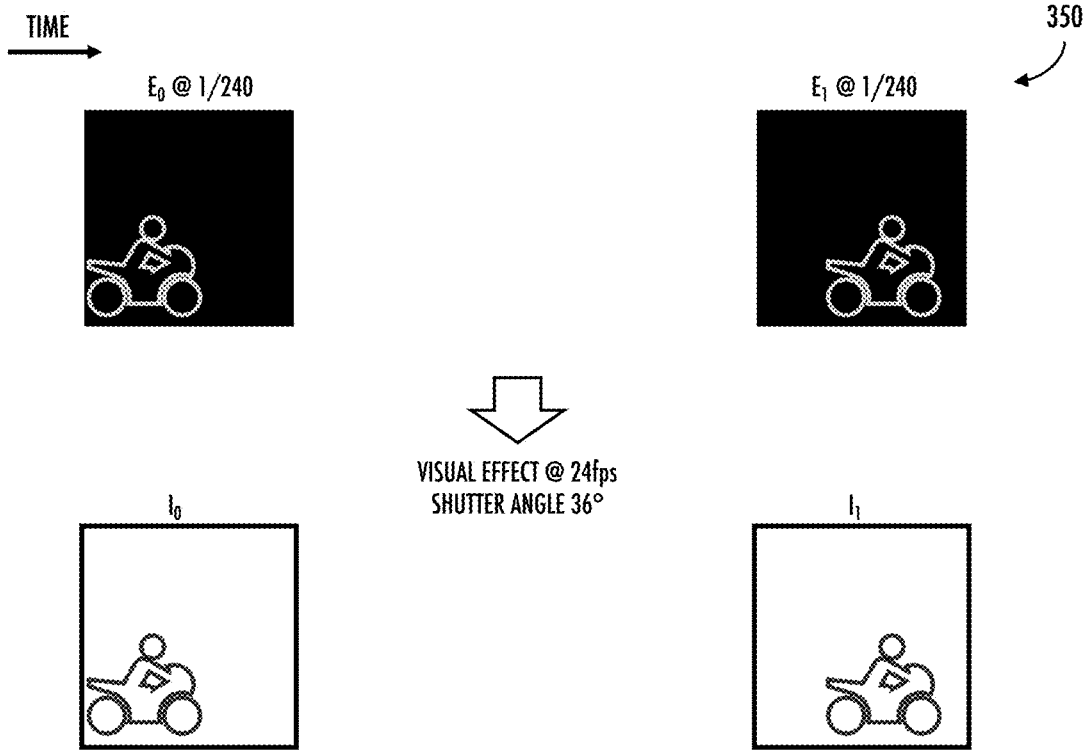

FIG. 3 is a graphical representation of different visual effects corresponding to different shutter angles, useful in explaining various aspects of the present disclosure. In these examples, a camera captures an exposure (shown in white on black), and digitally develops the exposure to an image (shown in black on white). In a first scenario 300, a cinematic blur may be associated with a shutter speed of $\frac{1}{48}^{th}$ of a second and a frame rate of 24 fps (a shutter angle of 180°); this setting results in fluid motion and a distinctive blurring. In a second scenario 350, an action camera may capture the same scene using a faster shutter speed (e.g., 5× faster, $\frac{1}{240}^{th}$ of a second) for the same frame rate resulting in a much smaller shutter angle (36°). As shown, the details may be much crisper, resulting in "stuttering" artifacts when rendered at a slower frame rate (e.g., 24 fps, 25 fps, 30 fps) relative to the original capture frame rate (e.g., 240 fps). As a practical matter, the exposure settings are fixed once captured; post-processing (after image capture) can mask artifacts with noise, but it cannot recover image information (signal).

More recently, action cameras have continued to push the edge of the camera sensor capabilities. To capture images across a large range of light conditions, most action cameras support exposure times as short as $\frac{1}{1000}^{th}$ of a second—this speed ensures that every frame is crisp in detail. While action cameras can capture exposures at very high shutter rates, most cameras do not have a hardware pipeline with sufficient bandwidth to sustain capture at the sensor's maximum rates. Typically, the sensor captures at its shutter speed, and then transfers/processes the captured data at much slower rates.

Figure 4:
FIG. 4 is a graphical representation of an action camera usage scenario, useful in explaining various aspects of the present disclosure.
Figure 4:
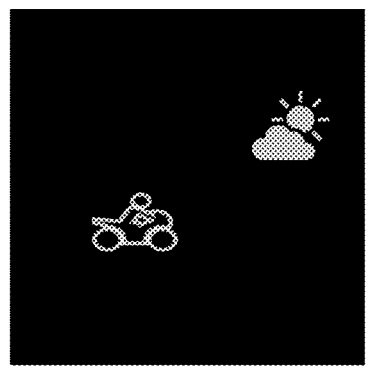
Figure 4:
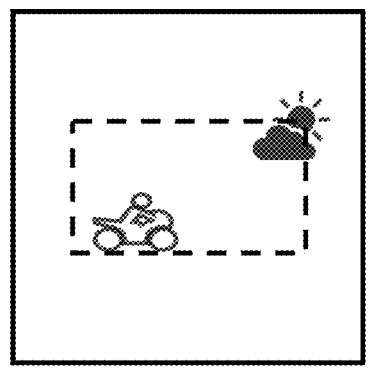
Figure 4:
Figure 4:
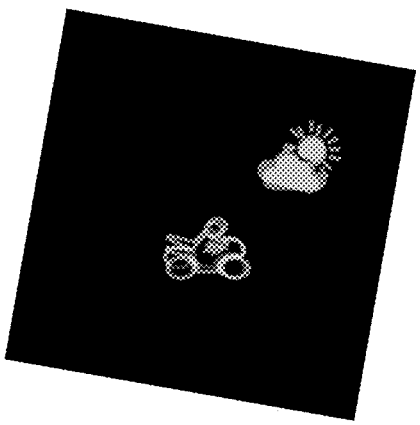
Figure 4:
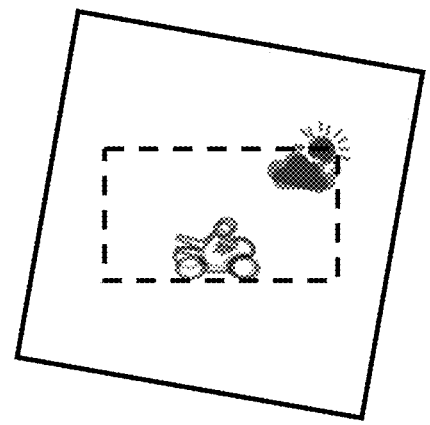
Figure 4:
Figure 4:
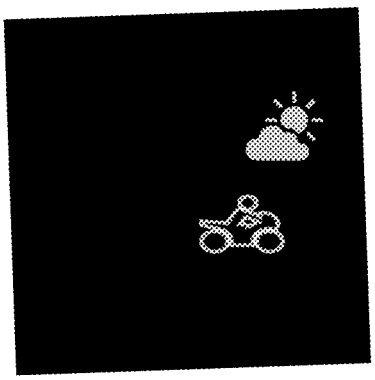
Figure 4:
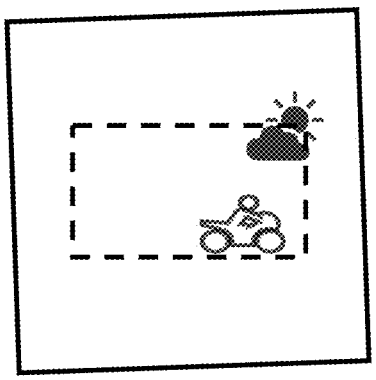
Figure 4:
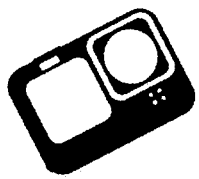
Figure 4:
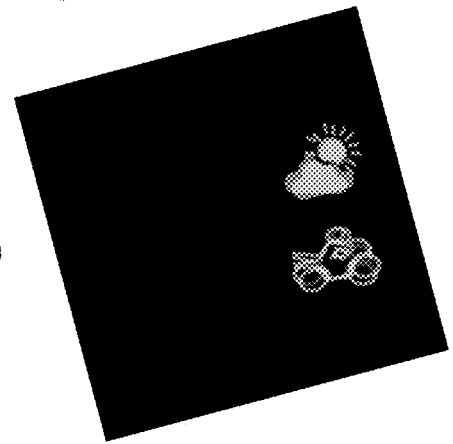
Figure 4:
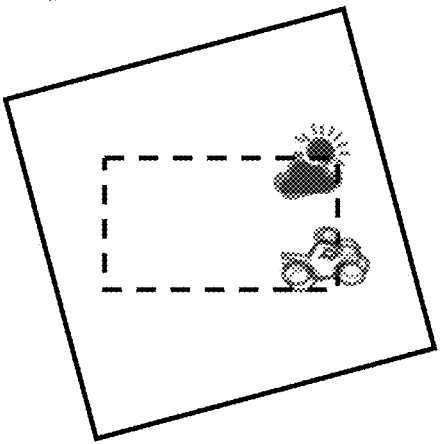

As previously alluded to, Electronic Image Stabilization (EIS) allows a shaky video to be stabilized by cropping and/or zooming the video to compensate for the camera movement. Unfortunately, running at cinematic exposure speeds ($\frac{1}{48}$th of a second) would result in blurry edges that are undesirable. For example, consider the scenario depicted within FIG. 4. As shown, an action camera that is using a shutter speed of $\frac{1}{48}$th of a second, and a video frame rate of 24 fps (e.g., a shutter angle of 180°), captures exposures E0-E3; the exposures are then digitally developed to images I0-I3. During EIS, the captured images are cropped and/or zoomed to remove the camera's motion, however, the apparent motion ghosts in the EIS stabilized footage remain. Additionally, the resulting footage appears "stable" and yet, the subject blurs in and out unnaturally.

While algorithms for reducing apparent motion can compensate for image artifacts due to camera motion (e.g., jitter), they do not account for artifacts introduced by low shutter speed (e.g., blurs). Existing autoexposure algorithms leave the shutter open in low light, and use the lowest acceptable ISO (sensor gain), to reduce noise. However, "motion blur" is caused by long shutter times in lowlight; this creates strange effects once the footage is stabilized. When watching videos, the viewer subconsciously correlates camera motion and motion blur (just the same as when walking or running). But, when the motion of the camera is removed using EIS, the blurring no longer makes sense. It is, however, important to clarify that EIS does not add or remove motion blur; the 'blurring' effect is purely perceptual. Existing solutions for this effect usually disable or reduce EIS in low light.

More directly, existing algorithms for exposure settings are based on an ideal camera paradigm. In other words, the algorithms only seek to maximize signal and/or reduce noise based on shutter speed, ISO (sensor gain), and aperture (where available). Other considerations such as e.g., image stabilization and/or aesthetic style are not prioritized. These assumptions are ill-suited for action cameras that are typically used in dynamic situations (where the camera itself is moving) and/or where the photographer must work with natural/available lighting.

Various aspects of the present disclosure adjust autoexposure algorithms to account for stabilization considerations. In one exemplary embodiment, a configurable range of shutter speeds for the light conditions is selected based on EIS requirements. The range of shutter speeds may allow a user (or a smart device) to trade-off a desired amount of blur for image quality, and vice versa. Instead of automatically selecting exposure parameters to maximize image quality/reduce noise, the exposure parameters may dynamically adjust for motion blur and/or lighting changes.

Figure 5:
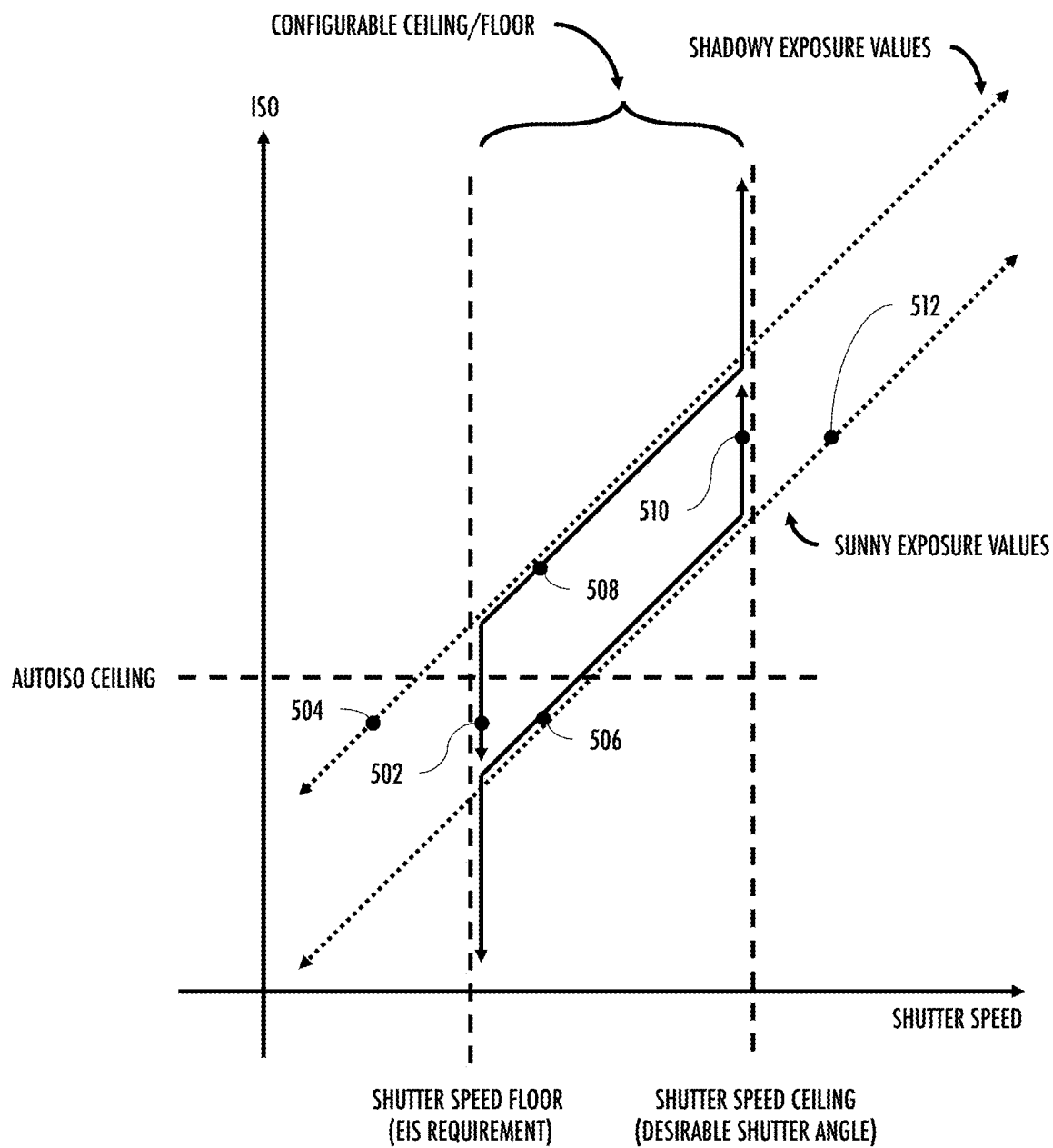
FIG. 5 is a graphical representation of different exposure value curves, consistent with the various principles described herein.

FIG. 5 is a graphical representation of different exposure value curves, consistent with the various principles described herein. As shown, a fixed aperture camera can adjust its ISO or shutter speed to achieve a desired exposure value. Under constant lighting, the range of equivalent exposure values may be represented as a curve. Notably however, different light conditions may have different exposure value curves. For instance, low light conditions (e.g., shadowy exposure values) may require larger ISO values to achieve the same exposure value, relative to well-lit conditions (e.g., sunny exposure values). Furthermore, since real-world sensors incur more noise when increasing sensor gain, most cameras implement an ISO ceiling (the camera may preferentially select lower ISO and longer shutter times.)

Consider an example of a mountain biker with an action camera mounted to their handlebars, recording a trip through a wilderness canyon. The mountain biker has only very limited ability to control the action camera setting mid-action, also the lighting conditions may dramatically change outside of the mountain biker's control. For example, as the mountain biker passes under trees and between the canyon walls, the camera must operate in the shadows. When the mountain biker enters open space, the camera may need to adjust to well-lit (or even high ambient light) conditions. Interesting footage may only be fleeting moments in the periphery of capture which do not provide enough advance notice to allow a user to adjust capture settings (e.g., a startled deer bolting off). For aesthetic reasons, the footage should be stabilized to the maximum extent possible.

In one exemplary embodiment, the camera implements a "minimum shutter speed control". During operation, a floor (e.g., $1/240^{th}$ of a second) for shutter speed prevents excessive motion blur; this ensures that EIS can function normally even in low light settings. For instance, the mountain biker may capture footage at ISO/shutter speed setting 502 while riding in the canyon; even though normal camera operation might prefer ISO/shutter speed setting 504. The captured footage at setting 502 may have higher noise than would otherwise be captured at setting 504 due to the higher ISO sensor gain, but at least the footage can still be stabilized with EIS.

At a later point along the trip, the mountain biker is capturing footage in a well-lit expanse using setting 506. However, while passing underneath foliage, the camera needs to shift to the shadowy exposure value curve. Normally, a camera might transition to setting 504 to maintain the same exposure values while staying under the AutoISO ceiling. However, the exemplary camera transitions to setting 508 instead, which continues to maintain shutter speed (and preserve EIS).

In other words, one exemplary embodiment preserves shutter speed, while trading-off ISO to compensate (an ISO priority, similar to a shutter priority). During operation, the camera will still aim for the lowest ISO, but with the modified minimum shutter condition. For example, if default settings would automatically adjust to 100 ISO with a $1/50^{th}$ second exposure but the user has set a $1/100^{th}$ second floor, then the shutter would be forced to use a 400 ISO. More directly, the camera can still automatically compensate for lighting, but within controllable gain and shutter limits.

Additionally, some variants may also impose a shutter speed ceiling such that the captured footage does not fall below a desired shutter angle. For instance, the mountain biker may have an over-lit capture scenario. In this case, the exemplary camera may use setting 510 to maintain a consistent shutter speed (instead of setting 512, which would be the equivalent exposure value); this ensures that the resulting footage has similar motion blur effects to the rest of the footage.

Notably, the terms "shutter speed ceiling" and "shutter angle floor" are synonymous in effect; similarly, "shutter speed floor" and "shutter angle ceiling" are analogous. Notably, faster shutter speeds correspond to smaller shutter angles (for the same video frame rates) and vice versa. For example: a shutter speed of $1/48^{th}$ of a second corresponds to 180° for 24 fps video, a shutter speed of $1/240^{th}$ of a second corresponds to 36° for 24 fps video, a shutter speed of $1/480^{th}$ of a second corresponds to 18° for 24 fps video, etc.

Exemplary Stabilization and Blending of Exposures

The foregoing minimum shutter speed control techniques described above enable low light captures that still meet EIS requirements (which is an improvement over techniques that disable EIS for low light), however additional improvements may be possible with stabilization and blending techniques post-capture. As a practical matter, the ability to select the subject and define its motion blur and/or stabilization, may be useful for creating a variety of different aesthetic effects. For example, a mountain biker may encounter another moving object (such as a running deer) and want to have motion blur for the moving object but keep the periphery sharp despite the camera shake. Shooting unplanned events in natural light conditions would provide significant challenges for any of the existing camera techniques. Action cameras have even more difficulty due to the significant user interface challenges (small form factor, ruggedized design, and in many cases mounted/hands-free operation).

As previously noted, high shutter speeds have crisp edges and minimize motion blur; low shutter speeds have too much motion blur and cannot be stabilized with EIS. Blurring could occur from either, or both, subject motion and the camera motion. Most notably, shutter speed indiscriminately affects both types of blurring; whereas EIS is focused on stabilizing the subject of interest by removing camera shake. In other words, the combinations of EIS and shutter speed can only stabilize the subject of interest, but it cannot distinguish between the two different sources of blurring.

Figure 6:
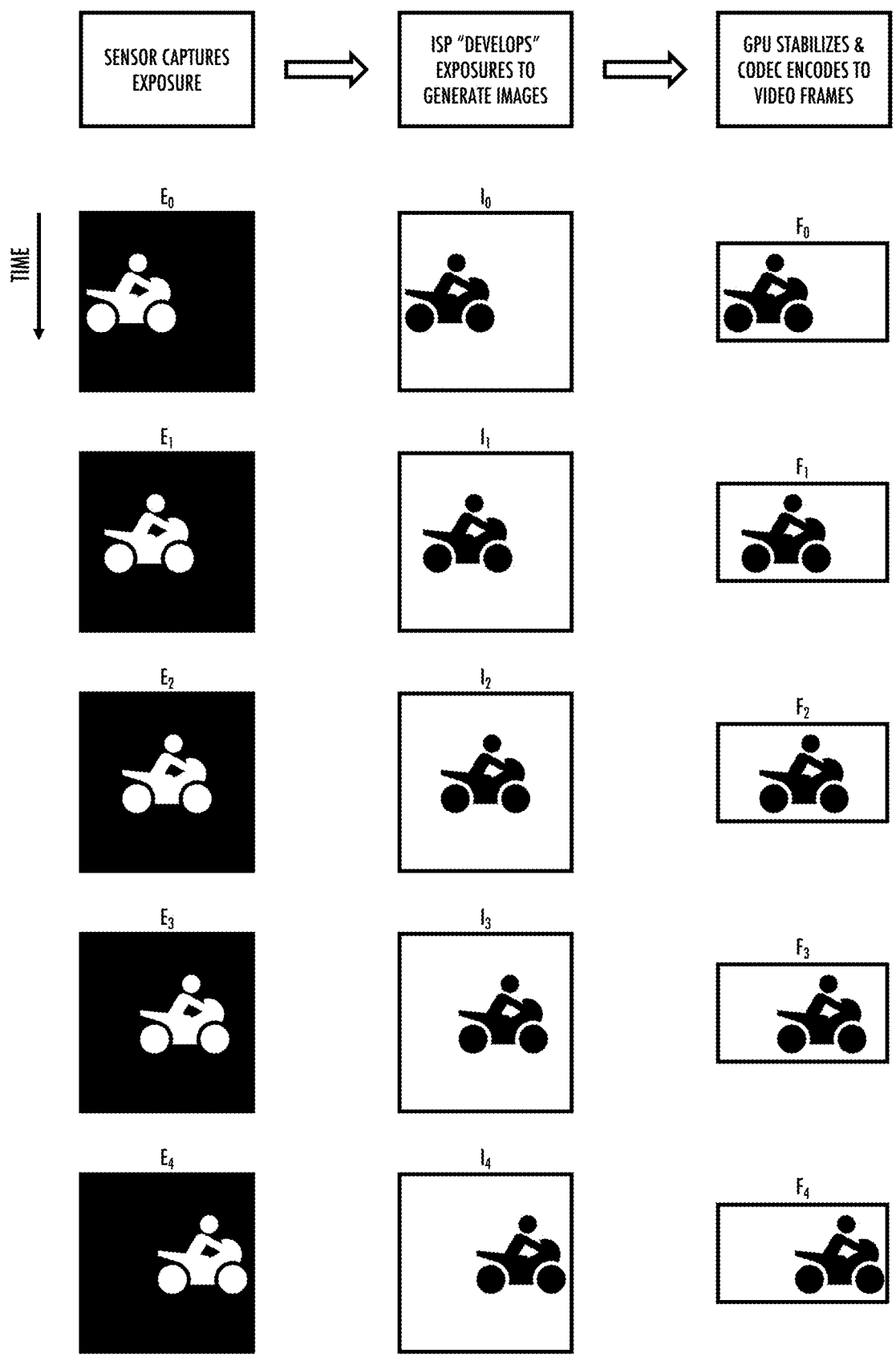
FIG. 6 is a graphical representation of digital camera operation, useful in explaining various aspects of the present disclosure.

As a brief but important tangent, FIG. 6 provides a graphical representation of camera operation. Initially, the camera captures several exposures ($E_0$-$E_4$) at a first shutter speed (e.g., $1/480^{th}$ of a second). In digital cameras, each exposure measures light intensity and color information according to the dynamic range and spatial geometry of the camera sensor's individual photosensitive elements. Specifically, each pixel corresponds to photons that were collected by a photosensitive element, over a period of time (the exposure window). The chrominance for the pixel is determined by the spatial location, which corresponds to a color of a color filter array (CFA).

Then exposures are developed into image data ($I_0$-$I_4$). However, the human visual system does not perceive light the way the camera's photosensitive elements do. In particular, the photosensitive elements convert photons to voltages; thus, doubling the collected photons results in doubling the voltage (for the same gain settings, within the sensor's operating range). This is colloquially described as a "linear" relationship. In contrast, human eyes perceive light "non-linearly"; twice the amount of light results in only marginally greater brightness; this enables the human eye to perceive light over a much larger range of intensities. Notably, photosensitive elements may also have non-linear behaviors; for example, a sensor element that is saturated (e.g., above the sensing range) or substantially empty (e.g., below the noise floor) may be represented with a clipped value (e.g., a maximum or minimum value that can be represented by a numeric tuple). Generally, these non-linear behaviors are undesirable and affect the image quality.

Additionally, a camera captures chrominance information differently than the eye does. The human visual system perceives light with three different types of "cone" cells with peaks of spectral sensitivity at short ("blue", 420 nm-440 nm), middle ("green", 530 nm-540 nm), and long ("red", 560 nm-580 nm) wavelengths. Human sensitivity to red, blue, and green change over different lighting conditions; in low light conditions, the human eye has reduced sensitivity to red light but retains blue/green sensitivity, in bright conditions, the human eye has full color vision. Camera sensors have a linear response under most light conditions. Cameras use several different color correction techniques to fit the reference color space of human perception.

Figure 7:
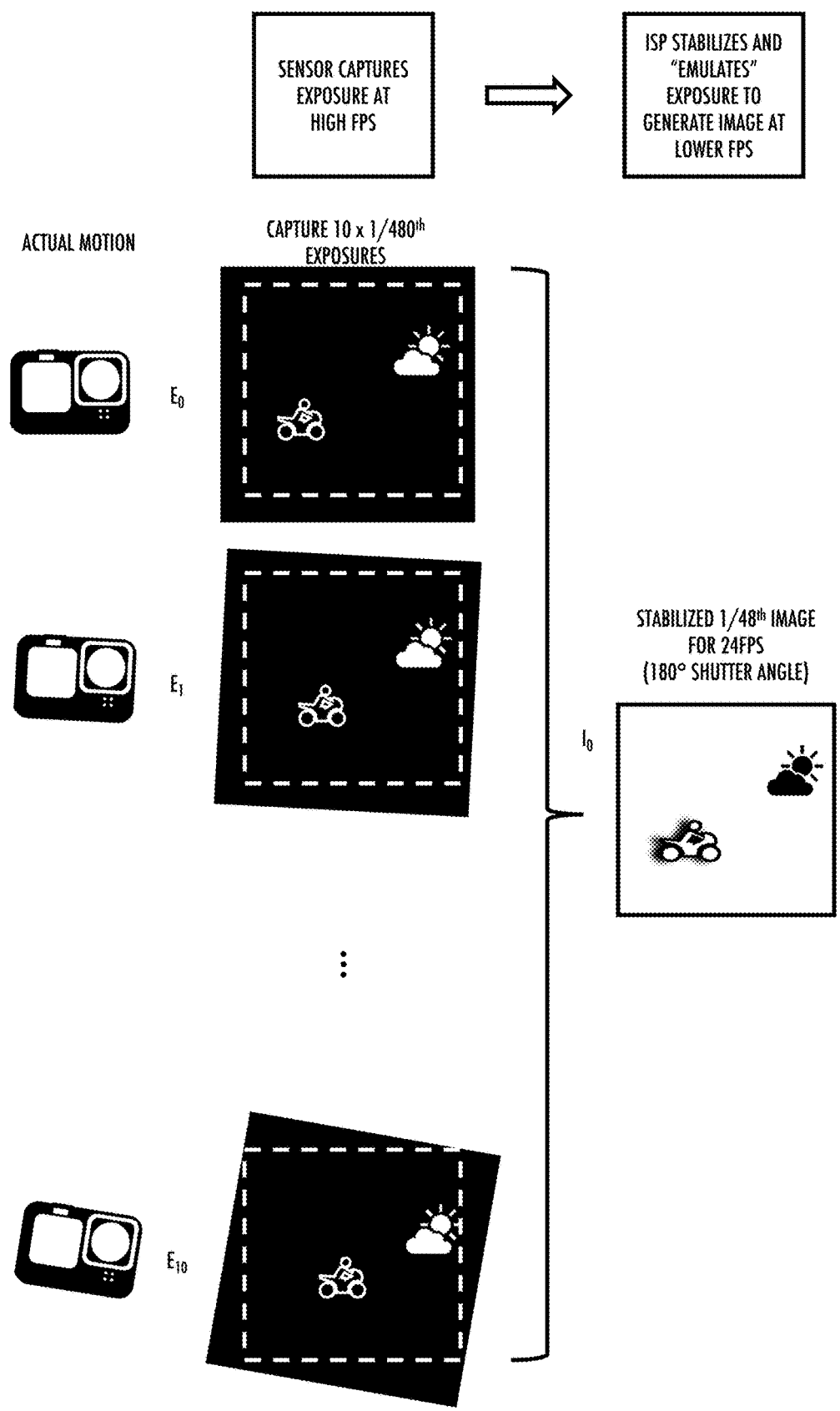
FIG. 7 is a graphical representation of exemplary techniques for stabilization and blending of exposures, consistent with the various principles described herein.

FIG. 7 is a graphical representation of exemplary techniques for stabilization and blending of exposures, consistent with the various principles described herein. In one exemplary aspect, the action camera captures exposures at a high shutter speed, uses in-camera processing to stabilize the exposures, and mathematically emulates the blur of a different shutter speed to generate a stabilized image. For example, the action camera captures exposures at a much higher shutter speed than the intended media rate (e.g., $\frac{1}{480}^{th}$ of a second, or 480 fps). The exposures are demosaiced at the higher frame rate. The high frame rate exposures are also converted to linear red, green, blue light values. Then, the exposures are stabilized to compensate for camera shake using rotation, zooming, warping, and/or other EIS-like operations. The stabilized exposures are then blended into images with the appropriate shutter angle for the intended media rate (e.g., 10 exposures are blended into a single image, to create a shutter angle of 180° for 24 fps.)

Unlike techniques that process each exposure to an image and then stabilize the groups of images (as described in FIG. 6 above), the exemplary embodiment stabilizes multiple exposures to generate a single stabilized image. In the specific implementation, the exposures are linear light data (tuples of red, green, and blue values). Other exposure formats may include e.g., raw data, YCrCb, YUV, CMYK, XYZ, etc. Typically, in-camera EIS techniques are used to post-process generic image data (JPEG, MPEG, etc.); in contrast, the exemplary stabilization techniques described herein are performed on exposure data that is linear (rather than image data that is developed for non-linear human perception). As discussed below, linearity may advantageously enable simplified blending techniques (summation, accumulation, etc.); non-linear data may require more sophisticated blending algorithms and/or introduce undesirable artifacts.

In one exemplary implementation, a "designated view" of the linear light data (may be rotated with respect to the originally captured view (within the bounds of the stabilization margin). Digitally zooming (proportionate shrinking or stretching of raw data), warping (disproportionate shrinking or stretching of raw data), and/or other linear data manipulations may also be used to maintain a desired perspective or subject of interest, etc.

In one exemplary embodiment, the exemplary stabilization techniques uses sensor data (e.g., accelerometer and gyroscope) to determine the movement of the capture device. Then, exposure data may be rotated (tilted) to counteract the sensed motion. More generally, any technique for stabilization may be substituted with equal success. For example, stabilization could be determined based on motion estimation techniques (e.g., inferred based on ideal perspective shifts). In another example, camera rotations can be calculated based on the average image rotation, and/or zoom and warp over the entire exposure (the entire exposure moves according to a fixed camera body).

In one exemplary embodiment, the stabilized exposures are blended using a linear sum of the color data for each pixel of the image. As previously noted, during each exposure, the photosensitive sensors collect photons which are then translated to chrominance/luminance data (a captured pixel). However, each pixel of the stabilized image (a stabilized pixel) may correspond to the chrominance/luminance values for potentially multiple different captured pixels since stabilization changes pixel location to counteract the camera's movement. Furthermore, the shorter capture duration of each exposure results in fewer collected photons for each captured pixel (which would result in a darker image if directly processed). In other words, stabilizing and summing the luminance values for N capture pixels after stabilization mathematically emulates an ideal stabilized pixel that captures exposures at 1/N the shutter speed. For example, summing the photons for 10 shorter exposures ($\frac{1}{480}^{th}$ of a second) emulates the photons that would be collected during 1 longer exposure ($\frac{1}{48}^{th}$ of a second).

By linearly summing the light information for several frames, the subject motion blur may be mathematically emulated for the stabilized exposures (which have the camera shake removed). In other words, jitter due to camera shake is negated but the subject motion blur can be controlled. Mathematically, summing multiple frames results in an increase of pixel luminance. Thus, doubling the summed frames corresponds to increasing the image brightness by 1 stop. For example, summing two exposures results in a 1-stop increase, summing four exposures results in a 2-stop increase, eight exposures correspond to a 3-stop increase.

Linear summation will have a "focusing effect" on stabilized pixels; linear summation of pixels that are not stabilized will average (or blur). Mathematically controlling the blurred portions of the image can be used to impart certain desirable effects. Different portions may be detected using e.g., feature detection, distance sensing, motion, etc. For instance, a camera may determine that a nearby object is the subject of interest, which is moving against a background (of non-interest). By stabilizing the subject of interest, the subject of interest is sharpened whereas the background will be blurred; this may be useful for selfie type videos (where the subject remains centered in the frame). In contrast, stabilizing the background will keep the "shot" stable and blur the subject of interest; this can impart a feeling of motion. In other words, the camera may be previously instructed to stabilize either the subject of interest, or the background, to provide the desired stabilization and linear summation effect.

In one specific implementation, the exposures may be stabilized based on camera sensor measurements. In one specific implementation, the camera's virtual optical center is smoothed based on accelerometer and/or gyroscope measurements. In some variants, the amount of stabilization may be further adjusted to create different stabilization effects. In other words, the captured rotation/inertia of images may be counterbalanced to impart the perception of a different rotation/inertia. For example, a small camera has less mass and so its rotation/inertia may quickly change direction; by slowing changes in movement and/or adding hysteresis effects, the resulting images may provide the feeling of a larger camera.

Using a linear summation of captured pixel luminance values may introduce artifacts where the sensor has a clipping range (e.g., the luminance exceeds the representable range of values). Conceptually, the large luminance value is clipped while surrounding lower luminance values are amplified during the summation (blending of exposures). In other words, very bright pixels may appear "dim" relative to surrounding pixels. Even though the sensed value cannot be accurately represented (since it was clipped), its clipped nature may still be preserved during blending. In one such variant, clipped (or nearly clipped) values may be multiplied by the number of blended exposures; thus, if 10 exposures are blended into a single image, the clipped pixel values are multiplied by 10. In this manner, light levels stay correct (e.g., bright pixels stay bright)

Aliasing artifacts may also occur between different exposures. High frequency blinking lights (such as are common in LEDs and/or artificial lighting) may create segmented lines. During stabilization and/or summation, these effects can be removed in part, or whole, by connecting the line segments. For example, an LED blinking at 60 Hz captured at 240 exposures/second, will have 2 exposures with the LED on, and 2 exposures with the LED off; by connecting the segments across all four exposures, the blurring effect of a longer exposure can be simulated.

In one exemplary embodiment, the "duty cycle" of exposures may be modified to provide any desired motion blur, even after capture. More directly, the exposures that are captured during the "on" phase are summed, and exposures captured during the "off" phase are ignored; off phase exposures may be retained to change the desired motion blur after-the-fact (e.g., during post-processing, etc.) For example, a shutter angle of 180° may use 50% on-phase, and 50% off-phase. Similarly, other shutter angles may be substituted with equal success, for example a 90° shutter angle could be achieved with 25% on-phase, 75% off-phase (e.g., $E_0$, $E_1$, $E_8$, $E_9$, etc.)

Notably, the actual maximum resolution that may be stabilized may be a function of discernable pixels. Excessive subject motion and/or camera motion may reduce the effective resolution. For example, a 4K image with 2-pixel width blur may only have an effective resolution of 2K. A similar effect may be achieved by down-sampling a higher resolution image and using stabilization and linear combination. This may be a more efficient use of bandwidth/processing capability where the end application can accept a lower resolution image. Similarly, where reduced resolution is acceptable for higher resolution applications, a down-sampled image may be upconverted to the higher resolution (with pixel blur).

As a brief aside, existing techniques for "frame stacking" are used in slow moving photography (e.g., astral shots, etc.) to combine many previously captured and pre-processed images together to create a single brighter image. However, these techniques often assume that the camera is stable or may physically move the camera to counteract known motion (e.g., the Earth's rotation). In contrast, the exemplary embodiments described above are implemented within action cameras that arbitrarily move in unexpected ways at real-time speeds. Stabilizing the exposures based on motion vectors may be too computationally expensive for embedded devices; also, the action camera may not retain all the image data (exposures) that would be used in existing frame stacking techniques. Finally, developed image data often cannot be linearly summed, due to color space issues, non-linearities, etc. In fact, existing frame stacked images may not attempt to preserve color fidelity (e.g., many astral images are re-colored in post-processing to add color to extra-spectral wavelengths that are not perceptible otherwise.)

The exemplary embodiments described above use the available subsystems of the action camera to greatly reduce processing complexity and operate within the action camera's real-time budgets. Specifically, the action camera uses sensor data (e.g., accelerometer and/or gyroscope measurements) to determine stabilization vectors at the time of capture. Sensor based stabilization is much less computationally demanding than optical feature detection/matching in post-processing. Additionally, using raw luminance/chrominance data for summation (rather than color space data) allows for linear operations; developed color space formats are non-linear and cannot be directly added together (e.g., doubling the number of captured photons would not correspond to a 2× increase color space (e.g., RGB, YUV, etc.)). Furthermore, while the ISP may require additional onboard memory to perform stabilization (2× for 2 exposures, 3× for 3 exposures, etc.), the alternative frame-stacking process in post-processing would require equivalent (or more) memory and much more processing power (100× more compute).

Optimized Variant for Known Shutter Angles

Figure 8:
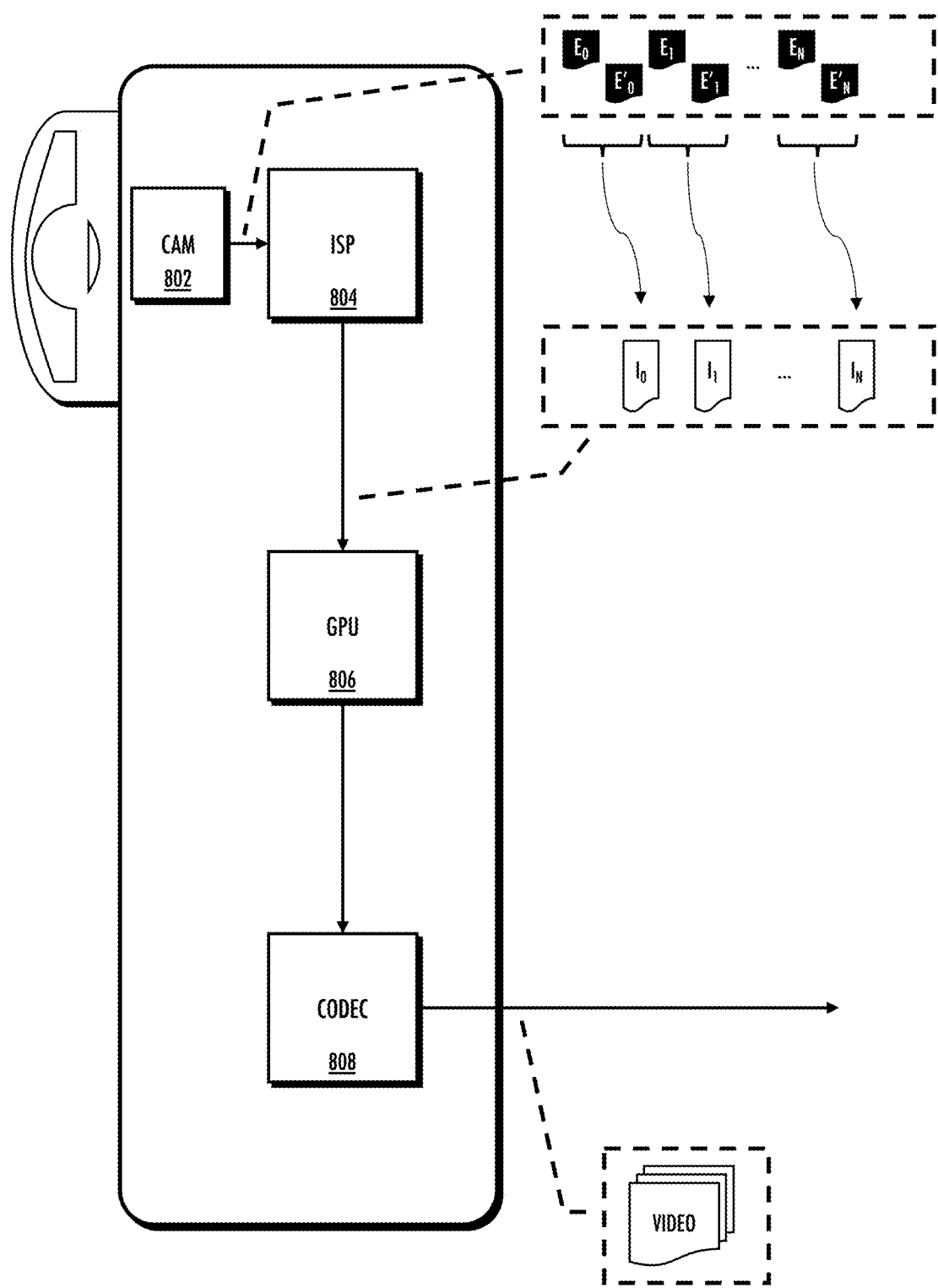
FIG. 8 is a logical block diagram of a camera, useful for illustrating various aspects of the present disclosure.

FIG. 8 is a logical block diagram of a camera useful for illustrating various aspects of the present disclosure. In one embodiment, the camera includes: a camera sensor 802, an image signal processor (ISP) 804, a graphics processing unit (GPU) 806, and a hardware codec 808. In this example, the digital camera captures slow-motion video (up to 500 exposures in a second, at shutter speeds of $\frac{1}{1000}^{th}$ of a second), but the footage is only played at normal presentation speeds (e.g., 24 fps, 30 fps, 60 fps). In the depicted camera, the camera sensor/ISP operate in lockstep during capture since there is no ability to buffer data and process it asynchronously.

Commodity components for camera sensors and ISPs may be bottlenecked to 120 fps (circa 2021-2022); as shown in FIG. 8, the camera sensor "bins" raw data transfers to achieve higher frame rates at reduced resolution; specifically, the sensor reduces the read out data for higher speeds by dropping resolution. For instance, an ISP may read every other pixel of a 5.4K sensor at 240 fps (for a shutter angle of 180°); this results in an effective frame rate of 480 fps. When replayed at 1080p, this provides acceptable resolution for many applications. Later (after capture), the captured footage may be encoded into video for playback at normal presentation speeds. Encoding does not need to occur at the time of capture since the capture and playback speeds are different, however as a practical matter, limitations in onboard memory may allow for buffering of only a few seconds.

While the camera of FIG. 8 may be able to stabilize and blend exposures, the camera sensor is working much faster than the rest of the system. Specifically, the camera sensor is capturing at 240 fps, but the ISP is only processing half of each exposure to achieve a shutter angle of 480 fps at 180°. Additionally, in this scenario, the ISP is constantly consuming power since the shutter speed is selected based on the desired shutter angle to create a resulting image.

Unfortunately, in the context of the exemplary stabilization and blending techniques described above, using the camera sensor/ISP bandwidth to transfer raw image data for every exposure consumes a much larger amount of power and bandwidth for each resulting image. Additionally, existing hardware may be bandwidth limited between processing components. In one optimized variant, the user may set a desired shutter angle, which allows the camera sensor/ISP bandwidth to reduce the number of transferred exposures.

Figure 9:
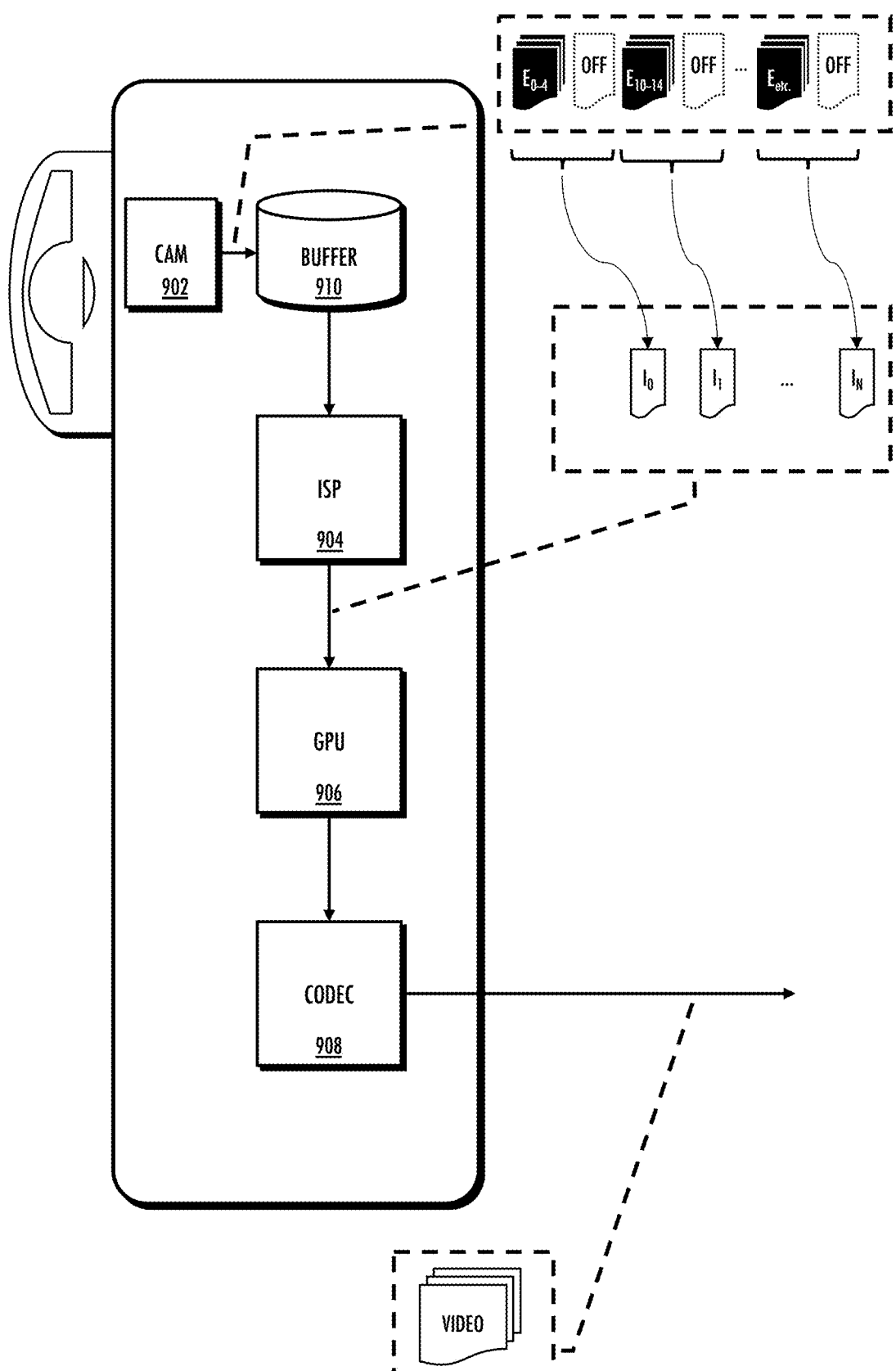
FIG. 9 is a logical block diagram of one camera variant that uses on-off duty cycles to capture (and/or grouping to process) exposures, useful for illustrating various aspects of the present disclosure.

Referring now to FIG. 9, one optimized variant uses an on-off duty cycle to capture and transfer exposures within bandwidth constraints. In one embodiment, the camera includes: a camera sensor 902, an image signal processor (ISP) 904, a graphics processing unit (GPU) 906, a hardware codec 908, and a buffer 910. In this example, the user configures the camera to shoot at a shutter angle to get a desired cinematic motion blur. Since exposures are captured at a different rate than the desired frame rate, the camera can operate its shutter speed at a higher speed but read a subset of the exposure data. This can reduce buffering to meet the bandwidth constraints.

In this example, the camera sensor is configured to capture exposures at a very high shutter speed (e.g., 120 exposures at $1/240^{th}$ of a second). The ISP reads the first five exposures ($E_0$-$E_4$), stabilizes and linearly combines them into a single image ($I_0$) for an effective shutter speed of $1/48^{th}$ of a second. In some embodiments, the camera sensor can power off during the off-phase of the duty cycle (e.g., $E_5$-$E_9$); in other embodiments, the camera sensor may be left on, and the ISP ignores the off-phase exposures. During subsequent playback, the resulting video corresponds to 24 fps with an effective shutter angle of 180°. Still other permutations may be substituted by artisans of ordinary skill to suit a variety of shooting styles, given the contents of the present disclosure. For example, $1/1000^{th}$ of second is commonly used in action cameras, a 480/1000 (N of M) duty cycle may be used with stabilization and blending at a 10:1 ratio as described above to achieve similar results.

Additionally, the camera may use the buffer 910 to further decouple sensor and ISP operation. During operation, the camera sensor may write to the buffer 910 at its shutter speed; thereafter, the ISP may read (and drain) the buffer 910 in order to achieve the desired shutter angle. In this manner, the camera sensor and ISP have some flexibility in timing, and do not need to operate in lock step. This may be particularly useful for variable rate processing.

Exemplary Methods and Apparatus

Figure 10:
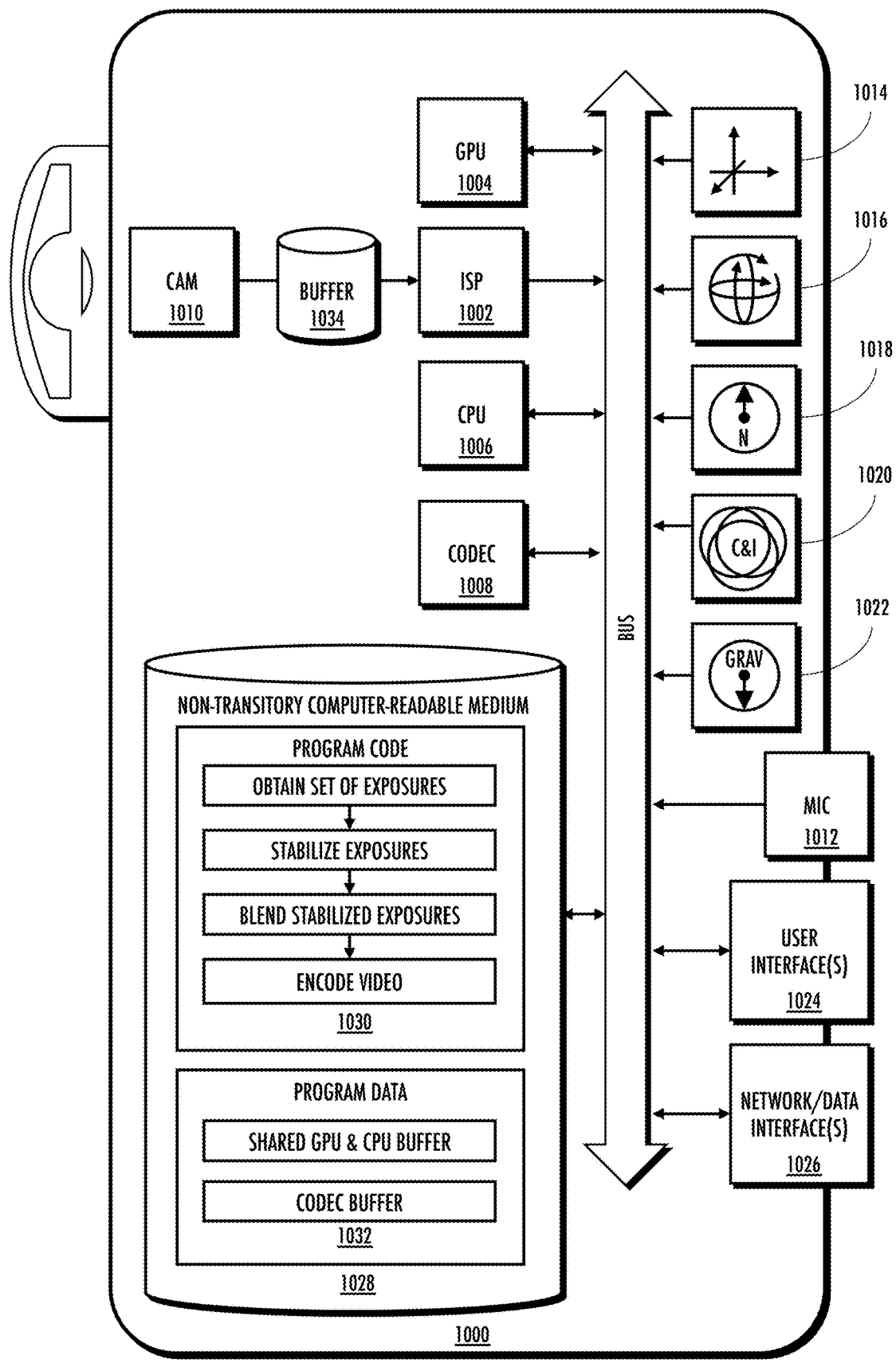
FIG. 10 is a logical block diagram of a camera device, useful in conjunction with various aspects of the present disclosure.

FIG. 10 is a logical block diagram of a camera device 1000, useful in conjunction with various aspects of the present disclosure. The camera device 1000 includes a processor subsystem, a memory subsystem, a sensor subsystem, a user interface subsystem, a network/data interface subsystem, and a bus to provide data communication between them. During operation, the camera device 1000 includes logic that is configured to: obtain a set of exposures, stabilize the exposures, blend the stabilized exposures, and encode the resulting images to video.

In one exemplary embodiment, the camera device 1000 may be an action camera that captures audio and/or video footage. Other embodiments of camera devices may include without limitation: a smart phone, a tablet, a laptop, an aerial drone, security cameras, self-driving cars, smart appliances and/or industrial automation, and/or any other source of data.

In one embodiment, the processor subsystem may read instructions from the memory subsystem and execute them within one or more processors. The illustrated processor subsystem includes: an image signal processor (ISP) 1002, a graphics processing unit (GPU) 1004, a central processing unit (CPU) 1006, and a hardware codec 1008. In one specific implementation, the ISP 1002 maps captured camera sensor data to a linear color space. ISP operations may include without limitation: demosaicing, color correction, white balance, and/or autoexposure. In addition, various exemplary implementations of the ISP additionally stabilize and blend exposures, as described in greater detail below.

In one specific implementation, the GPU 1004 performs in-device modifications to image data; GPU tasks may be parallelized and/or constrained by real-time budgets. GPU operations may include, without limitation: lens corrections (warping, stretching), image corrections (shading, blending), noise reduction (filtering, etc.) In one specific implementation, the CPU 1006 controls device operation and/or performs tasks of arbitrary complexity/best-effort. CPU operations may include, without limitation: operating system (OS) functionality (power management, UX), memory management, etc. In one specific implementation, the hardware codec 1008 converts image data to an encoded data for transfer and/or converts encoded data to image data for playback.

Other processor subsystem implementations may multiply, combine, further subdivide, augment, and/or subsume the foregoing functionalities within these or other processing elements. For example, multiple ISPs may be used to service multiple camera sensors. Similarly, codec functionality may be subsumed with either GPU or CPU operation via software emulation.

In one embodiment, the sensor subsystem may sense the physical environment and capture and/or record the sensed data. In some embodiments, the sensor data may be further stored as a function of capture time (so-called "tracks"). Tracks may be synchronous (aligned) or asynchronous (non-aligned) to one another. The illustrated sensor subsystem includes: a camera sensor 1010, a microphone 1012, an accelerometer (ACCL) 1014, a gyroscope (GYRO) 1016, a magnetometer (MAGN) 1018. In the illustrated implementation, combinations of the sensed data can be used to derive translational and/or rotational movements; such derived data may include: camera orientation and/or image orientation quaternions (CORI/IORI) 1020 as well as gravity vectors (GRAV) 1022.

In one specific implementation, the camera sensor 1010 senses light (luminance) via photoelectric sensors (e.g., CMOS sensors). A color filter array (CFA) value provides a color (chrominance) that is associated with each sensor. The combination of each luminance and chrominance value provides a mosaic of discrete red, green, blue value/positions, that may be "demosaiced" to recover a numeric tuple (RGB, CMYK, YCrCb, etc.) for each pixel of an image (also referred to herein as "raw" data). In one specific implementation, the microphone 1012 senses acoustic vibrations and converts the vibrations to an electrical signal (via a transducer, condenser, etc.) The electrical signal may be further transformed to frequency domain information. In one specific implementation, the accelerometer (ACCL) 1014 measures acceleration and gyroscope (GYRO) 1016 measure rotation in one or more dimensions. These measurements may be mathematically converted into a four-dimensional (4D) quaternions to describe the camera orientation (CORI) 1020, and electronic image stabilization (EIS) may be used to offset image orientation (IORI) 1020 to counteract device motion. In one specific implementation, the magnetometer (MAGN) 1018 may provide a magnetic north vector (which may be used to "north lock" video and/or augment location services such as GPS), similarly the accelerometer (ACCL) 1014 may also be used to calculate a gravity vector (GRAV)

1022. Other sensor subsystem implementations may multiply, combine, further subdivide, augment, and/or subsume the foregoing functionalities within these or other processing elements. For example, two or more cameras may be used to capture panoramic (e.g., wide or 360°) or stereoscopic content. Similarly, two or more microphones may be used to record stereo sound.

In one embodiment, the user interface subsystem may be used to present media to, and/or receive input from, a human user. In some embodiments, media may include audible, visual, and/or haptic content. Examples include images, videos, sounds, and/or vibration. In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen). In one exemplary embodiment, the user interface subsystem 1024 may include an assortment of a touchscreen, physical buttons, and a microphone.

In one embodiment, the network/data interface subsystem may be used to receive data from, and/or transmit data to, other devices. In some embodiments, data may be received/transmitted as transitory signals (e.g., electrical signaling over a transmission medium.) In other embodiments, data may be received/transmitted as non-transitory symbols (e.g., bits read from non-transitory computer-readable media.) The network/data interface subsystem may include: wired interfaces, wireless interfaces, and/or removable memory media. In one exemplary embodiment, the network/data interface subsystem 1026 may include network interfaces including, but not limited to: Wi-Fi, Bluetooth, Global Positioning System (GPS), USB, and/or Ethernet network interfaces. Additionally, the network/data interface subsystem 1026 may include data interfaces such as: SD cards (and their derivatives) and/or any other optical/electrical/magnetic media (e.g., MMC cards, CDs, DVDs, tape, etc.)

In one embodiment, the memory subsystem may be used to store data locally at the camera device 1000. In one exemplary embodiment, data may be stored as non-transitory symbols (e.g., bits read from non-transitory computer-readable media.) In one specific implementation, the main memory subsystem 1028 is physically realized as one or more physical memory chips (e.g., NAND/NOR flash) that are logically separated into memory data structures. The memory subsystem may be bifurcated into program code 1030 and/or program data 1032. In some variants, program code and/or program data may be further organized for dedicated and/or collaborative use. For example, the GPU and CPU may share a common memory buffer to facilitate large transfers of data therebetween. Similarly, the codec may have a dedicated memory buffer to avoid resource contention.

As a brief aside, certain types of image manipulations (e.g., warp track determination, image stitching, etc.) may be more efficiently performed in a shared memory buffer of a digital camera (the CPU and GPU share a common memory subsystem, each processor can access the same data); the same techniques may require much more data traffic when performed in split memory subsystems that are commonly used in high performance workstations (e.g., the image data must be transferred back and forth between dedicated CPU buffers and dedicated GPU buffers).

Referring back to FIG. 10, in one exemplary embodiment, the memory subsystem may include a buffer 1034 in data communication with the ISP 1002 that stores raw data for each camera exposure; the buffer 1034 is read (drained) by the ISP 1002. In one implementation, the buffer 1034 is a first-in-first-out (FIFO) memory. In other implementations, the buffer 1034 may be subdivided into banks which are written-to/read-from in sequence. In some embodiments, the buffer 1034 may be subsumed within the camera sensor 1010, the ISP 1002, or even as part of the main memory subsystem 1028. During operation, the buffer 1034 decouples camera sensor timing from the ISP timing; in other words, the camera sensor can queue image data according to its shutter speed, and the ISP can process the image data according to its considerations (e.g., power, bandwidth, memory capacity, real-time budget, etc.) Still other implementations may be substituted with equal success given the contents of the present disclosure.

In one embodiment, the program code includes non-transitory instructions that when executed by the processor subsystem cause the processor subsystem to perform tasks which may include: calculations, and/or actuation of the sensor subsystem, user interface subsystem, and/or network/data interface subsystem. In some embodiments, the program code may be statically stored within the camera device 1000 as firmware. In other embodiments, the program code may be dynamically stored (and changeable) via software updates. In some such variants, software may be subsequently updated by external parties and/or the user, based on various access permissions and procedures.

In one embodiment, ISP 1002 of the processor subsystem: obtains a set of exposures, stabilizes the set of exposures, and blends the set of stabilized exposures to generate blended stabilized images.

In one exemplary embodiment, the exposures are read from a buffer. In other embodiments, the exposures may be received from a camera sensor. Still other embodiments may push or pull the exposures across a network/data interface or access a memory card. More generally, any technique for obtaining the set of exposures may be substituted with equal success.

In one variant, the set (or "group") of exposures may be obtained in a "grouped" fashion. Grouping refers to techniques for combining multiple exposures obtained at a first rate, for processing at a second rate. In one specific implementation, the first rate is determined based on the desired shutter angle (and corresponding shutter speeds) whereas the second rate is determined based on processing constraints (e.g., the ISP's 1002 real-time processing budget for encoding). For example, in the aforenoted embodiments, exposures were captured and grouped for delivery according to an on-phase/off-phase duty cycle and/or any other time-multiplexed delivery scheme. More generally however, grouping may entail interlacing, discarding, and/or ignoring the exposures to rate match between the first rate and the second rate.

As used herein, the term "image" refers to any data structure that describes luminance and chrominance within a spatial geometry. Images may include linear pixel information (e.g., exposures, summations of exposures, blends of exposures, etc.) or non-linear pixel information (e.g., developed images, clipped values, etc.)

As used herein, the term "exposure" refers to the raw image data that corresponds linearly to captured light (where not clipped by sensor capability). In one exemplary embodiment, exposures are captured by a camera sensor (prior to hue, color correction, white balance and/or any other image signal processing (ISP) image data manipulations); in other embodiments, exposures may include ISP processed image data that preserves linearity. The term "linear" and "linearity" refer to data that preserves the arithmetic properties of addition and scalability across a range. For example, when incident light on a photosite is doubled, the number of photoelectrons doubles, and their corresponding luminance values double. In contrast, "non-linear" refers to data that disproportionately scales across a range; as previously described above, images that have been developed (hue, color corrected, white balanced, etc.) are non-linear and cannot be linearly summed.

As used herein, the terms "emulation", and/or "emulate" refer to any technique that combines multiple exposures of a first shutter speed to provide visual effects akin to a second shutter speed. In one exemplary embodiment, a "mathematical emulation" refers to linear and/or non-linear blends of shorter exposure durations to emulate a longer exposure duration. Notably, emulation does not provide a perfect re-creation, the emulation merely mimics desirable effects (motion blur) without undesirable effects (camera shake).

Notably, High Dynamic Range (HDR) photography blends images with different exposures. For example, an HDR image that is composed from a baseline exposure, an exposure at −2 stops below baseline, and an exposure at +2 stops above baseline would be referred to as HDR with a "3-shot bracket" and "−2/0/+2 EV". While HDR provides a much larger dynamic range (e.g., 4-stops of additional range), the different exposure settings do not provide linear light data with shared exposure settings and must be composited together (not linearly summed/blended). In other words, since the bracketed exposures do not share exposure settings, they cannot be used to accurately simulate motion blur. HDR generally changes the exposure time between frames to generate the extended dynamic range, but this can create undesirable motion blur artifacts. Even if HDR only changed sensor gain, the clipping points of the exposures are different; in other words, the under/over exposed pixels would be under/overweighted in light value. In contrast, the techniques described herein use a shared exposure setting (shutter speed, ISO, aperture); as a result, the raw image data can be linearly summed, scaled, etc.

In one embodiment, the exposure data may include raw image data that represents light intensity and color information according to the dynamic range and spatial geometry of the camera sensor's individual photosensitive elements. Notably, the raw format is device specific; photosensors may be arranged in a variety of different spatial orientations and/or configurations (e.g., triangular, rectangular, hexagonal, mixed polygon, etc.) In one specific implementation, the exposure data is "developed" into images; the developing techniques may include noise reduction, white balance, color interpolation, lens shading correction, defect correction, local tone mapping, etc.

In one embodiment, the exposures are stabilized using techniques that provide EIS-like functionality. Since each exposure represents only a fraction of the luminance/chrominance value for a normal image, the existing EIS techniques may need modifications to correctly handle the sharper/darker exposures.

As but one such example, linearly summing eight (8) exposures is equivalent to a gain of 3 stops. Merely underexposing each of the exposures by 3 stops to compensate would be undesirable since this would favor the highlights over the shadows due to the sensor's noise profile. Instead, each image may be correctly exposed but summed and averaged to de-noise the image. Averaging the exposures may accomplish a similar effect that preserves (or even increases the gain of) the shadow details. Still other variants may do some combination summing and averaging that is tailored to the sensor's noise profile.

Sensor-based EIS-like logic counteracts apparent motion in exposures based on sensed movement data. Sensor-based EIS-like logic may need higher access times for accurate rotation/translation data. In some variants, this may require that the camera sensor/ISP has direct access to the sensor data (e.g., accelerometer/gyroscope data) or memory buffers of quaternions (e.g., CORI/IORI data). Additionally, sensor-based EIS-like logic may interpolate/extrapolate sensor data to provide fractional rotations/translations.

In one embodiment, the stabilized exposures are blended. In one exemplary embodiment, the stabilized exposures are linearly summed together. More generally, since the exposures preserve light linearity, a variety of other summations may be substituted with equal success. In some variants, exposures may use a weighted sum; for example, the middle range of exposures may be more heavily weighted than the starting/ending tails of the set. In other variants, exposures that are identified as "bad" (e.g., corrupted, out-of-range, etc.) could be replaced with another good exposure (e.g., $E_1$ could be replaced with either $E_0$, or $E_2$) or the resulting image may be rescaled (e.g., $I_0$ which is generated from 4 exposures (rather than 5), could be scaled-up by 25%). Still other examples of linear blending may be substituted with equal success, consistent with the present disclosure.

More broadly, the stabilization and blending of exposures, summations of exposures, blends of exposures, or other linear combinations may be broadly extended within the processing pipeline so long as linearity has been preserved. For example, post-ISP raw image data that has not been developed may preserve linearity; thus, in some variants, raw image data may be stabilized using EIS-like techniques and/or linearly blended. In one such case, developed images (non-linear) may be reverted to a linear color space; while conversion is a lossy process, doing so may allow a post-processing application to apply the exemplary stabilization and blending techniques to other cameras/archived videos, etc. (e.g., stabilization, linear blends, and/or shutter angle adjustments).

In one embodiment, the codec 1008 of the processor subsystem encodes the blended stabilized images into a video for delivery off-camera. Notably, EIS-like exposure stabilization may also provide many of the same benefits as in-camera image stabilization. For example, stabilized exposures may result in more stable images which can improve downstream operations (e.g., compression/decompression, encoding/decoding) by reducing the magnitude and number of motion vectors. In some cases, in-camera pre-processing logic may perform data manipulations on the stabilized images based on device and/or pipeline considerations. For example, the in-camera logic may compress/de-compress image data to improve device processing performance, reduce memory footprint, and/or reduce battery consumption. In some cases, the stabilized images (generated from multiple exposures) may be further processed with in-camera EIS stabilization to generate a stabilized video. In one such implementation, the in-camera EIS has a longer time horizon (e.g., seconds of video rather than sub-seconds of exposures/image), more resources, and/or more flexible processing budgets.

In some embodiments, the stabilized exposures may be retained for later image manipulations. This may be particularly useful to change shutter angle in post-processing (e.g., by either adding or subtracting exposures from the image). In some embodiments, the camera sensor may directly write its raw data to an external memory or to a memory buffer that is accessible via a network interface 1026. In some variants, the raw data may be individual exposures, groups of exposures, summed exposures, blended exposures, and/or any other form linear image data. The image data may be transferred to another device for display via removable media, network interfaces, and/or wireless transmission; common examples of removable media include e.g., non-volatile memory cards (such as MMC, SD, mini-SD, and micro-SD cards), Flash drives, hard drives, etc.

Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

As used herein, the term "computer program" or "software" is meant to include any sequence of human or machine cognizable steps which perform a function. Such program may be rendered in virtually any programming language or environment including, for example, Python, JavaScript, Java, C #/C++, C, Go/Golang, R, Swift, PHP, Dart, Kotlin, MATLAB, Perl, Ruby, Rust, Scala, and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method, comprising:
   receiving a shutter angle;
   receiving a first exposure and a second exposure from an image sensor;

stabilizing the first exposure and the second exposure;
linearly summing the first exposure and the second exposure to generate a blended exposure; and
developing the blended exposure within an image signal processor (ISP) to generate an image based on the shutter angle.

2. The method of claim 1, where the first exposure and the second exposure are captured at a first shutter speed of the image sensor.

3. The method of claim 2, where the blended exposure is a mathematical emulation of a second shutter speed that is slower than the first shutter speed.

4. The method of claim 1, where the first exposure and the second exposure comprises linear raw image data that corresponds linearly to captured light.

5. The method of claim 4, where the first exposure and the second exposure further comprises non-linear raw image data that corresponds to clipped pixel values; and
where linearly summing the first exposure and the second exposure further comprises scaling the clipped pixel values to remain clipped.

6. The method of claim 1, where stabilizing comprises at least one of: zooming, warping, and rotating, the first exposure relative to the second exposure.

7. The method of claim 1, further comprising encoding the image as a frame of a video.

8. An apparatus, comprising:
a camera sensor;
a processor subsystem comprising an image signal processor (ISP); and
a non-transitory computer-readable medium comprising instructions which, when executed by the processor subsystem, causes the apparatus to:
capture a first exposure and a second exposure during an on-phase of the camera sensor at a first shutter speed;
power-off the camera sensor during an off-phase;
stabilize the first exposure and the second exposure within the ISP; and
blend the first exposure and the second exposure to generate a blended exposure within the ISP.

9. The apparatus of claim 8, further comprising an accelerometer and a gyroscope that generate motion data; and
where the first exposure and the second exposure are stabilized based on the motion data.

10. The apparatus of claim 8, further comprising a buffer in data communication with the ISP; and
where the buffer is configured to store exposures for stabilization.

11. The apparatus of claim 10, further comprising second instructions that when executed by the ISP, causes the ISP to:
select the first exposure and the second exposure within a first group of exposures of the buffer; and
ignore a third exposure of the first group of exposures.

12. The apparatus of claim 11, further comprising:
a user interface subsystem configured to obtain a shutter angle selection; and
where the instructions when executed by the ISP, causes the ISP to select the first exposure and the second exposure within the first group and ignore the third exposure of the first group based on the shutter angle selection.

13. The apparatus of claim 11, further comprising a removable memory media; and
where the instructions when executed by the processor subsystem, causes the apparatus to store the third exposure to the removable memory media.

14. The apparatus of claim 8, further comprising a removable memory media; and
where the instructions when executed by the processor subsystem, further causes the apparatus to store the blended exposure and at least one of the first exposure and the second exposure to the removable memory media.

15. The apparatus of claim 8, where the instructions when executed by the processor subsystem, further causes the apparatus to group the first exposure and the second exposure for processing based on a time-multiplexed delivery scheme.

16. A non-transitory computer-readable medium comprising instructions which, when executed by a processor subsystem, causes a device to:
obtain a plurality of exposures;
obtain a shutter angle selection;
stabilize the plurality of exposures;
blend the plurality of exposures to generate a plurality of blended exposures;
develop a plurality of images from the plurality of blended exposures based on the shutter angle selection; and
encode a video from the plurality of images.

17. The non-transitory computer-readable medium of claim 16, where the instructions, when executed by the processor subsystem, further causes the device to determine the plurality of exposures to blend in order to emulate a shutter speed based on the shutter angle selection.

18. The non-transitory computer-readable medium of claim 17, where the instructions, when executed by the processor subsystem, further causes the device to:
obtain a playback speed selection and the shutter angle selection from a user; and
determine the plurality of exposures to blend to emulate the shutter speed based on the shutter angle selection and the playback speed selection.

19. The non-transitory computer-readable medium of claim 18, where the instructions, when executed by the processor subsystem, further causes the device to determine the plurality of exposures to blend based on at least one of: a bandwidth of an image signal processor (ISP), a processing capability of the ISP, and a memory capacity of an exposure buffer.

20. The non-transitory computer-readable medium of claim 16, where the instructions, when executed by the processor subsystem, further causes the device to:
obtain a different shutter angle selection;
blend a subset of the plurality of exposures to generate a different plurality of blended exposures;
develop a different plurality of images from the different plurality of blended exposures based on the different shutter angle selection; and
encode a different video from the different plurality of images.

* * * * *